United States Patent [19]

Miller

[11] 4,035,096
[45] July 12, 1977

[54] LATCHING MECHANISM FOR A COLLAPSIBLE OVERHEAD GUARD

[75] Inventor: Robert Henry Miller, Cleveland, Ohio

[73] Assignee: Towmotor Corporation, Mentor, Ohio

[21] Appl. No.: 643,414

[22] Filed: Dec. 22, 1975

[51] Int. Cl.² ............................................. F16B 7/10
[52] U.S. Cl. ................................ 403/322; 403/108; 248/408
[58] Field of Search .......... 403/322, 324, 328, 108; 248/408

[56] References Cited
U.S. PATENT DOCUMENTS

| | | | |
|---|---|---|---|
| 2,087,932 | 7/1937 | Zola et al. | 248/408 X |
| 2,547,455 | 4/1951 | Freeman | 248/408 X |
| 2,571,512 | 10/1951 | Youngberg | 403/108 |
| 2,659,413 | 11/1953 | Cramer | 248/408 X |
| 2,682,737 | 7/1954 | Oehler et al. | 403/108 |
| 2,909,212 | 10/1959 | Scherer | 248/408 |
| 3,443,784 | 5/1969 | Walkinshaw | 248/408 |

*Primary Examiner*—Andrew V. Kundrat
*Attorney, Agent, or Firm*—Phillips, Moore, Weissenberger, Lempio & Majestic

[57] ABSTRACT

A first member relatively movable with respect to a second member has a latching mechanism which comprises a pin in a first aperture in the first member in alignment with a second aperture in the second member. The latching mechanism includes spring biasing means for biasing the pin into engagement and lever cam means pivotally connected to an end of the locking pin, and link means against a bearing surface of the first member for retracting the pin against the force of the spring biasing means to disengage the pin from the second aperture. The spring biasing means is contained within a spring housing which is in one embodiment removably mounted on the first member by fasteners such as bolts, and the second embodiment by welding to a guide block mounted on the first member. A control mechanism including a control cable attached to a bell crank which is actuable by means of a shaft manually rotatable by means of a control lever serves to actuate the lever cam means to engage or release the locking pin. A plurality of such mechanisms are actuable by means of a single throw of the control lever.

9 Claims, 4 Drawing Figures

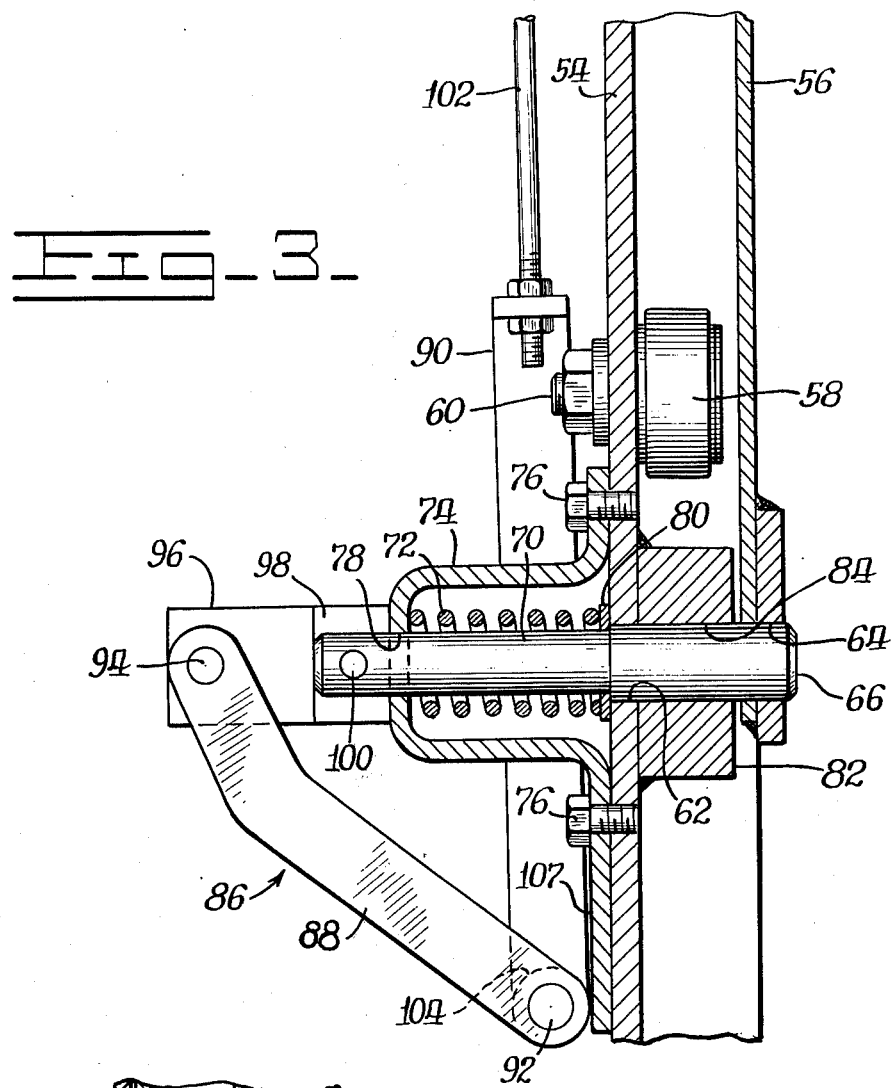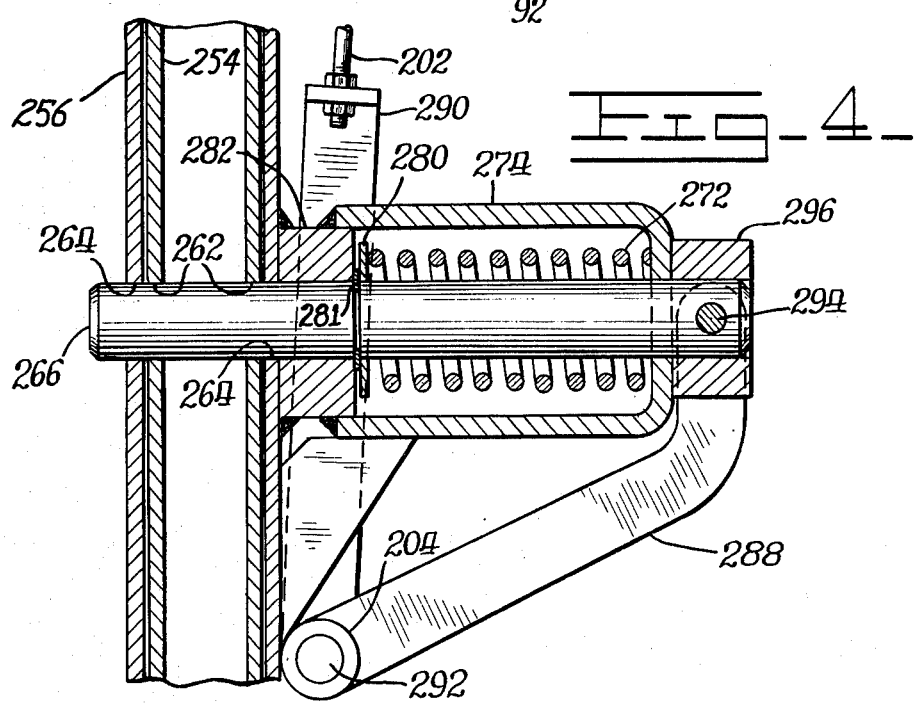

LATCHING MECHANISM FOR A COLLAPSIBLE OVERHEAD GUARD

BACKGROUND OF THE INVENTION

This invention is directed to latching mechanisms. More particularly, this invention is directed to elements for stopping movement of a first element relative to a second element.

It should be noted at the outset that while this invention disclosure has reference to a latching mechanism in conjunction with a collapsible overhead guard for a lift truck, such is for purposes of illustration only. The latching mechanism described has wider application to restrain movement between a pair of relatively movable members, including but not limited to telescoping support members such as found on lift trucks.

Currently many environments require the securing of a first member which is relatively movable to a second member. Positive and quick actuation and release of such locking mechanisms are extremely desirable. In addition, some environments require the use of a plurality of latching mechanisms that must be simultaneously operated. In these environments it is desired to have a single actuation of a control mechanism which will simultaneously latch or release the plurality of latching mechanisms.

SUMMARY AND OBJECTS

Therefore, the primary object of this invention is to provide an improved latching mechanism for restraining movememt of a first element relative to a second element.

It is a further object of this invention to provide such a latching mechanism including a control mechanism for simultaneously latching or releasing a plurality of such latching mechanisms.

The invention takes the form of a latching mechanism comprising a pin which is spring biased to be removably engageable within a second aperture in a second member while at the same time slidingly engageable within a first aperture and a first member. The latching mechanism includes a spring housing containing a spring for biasing the pin. The housing in one embodiment is removably mounted on the first element by means of fasteners, such as bolts. In a second embodiment, the spring housing is fixedly mounted to a guide block which is in turn mounted on the first member. A lever cam comprising a pair of links with pivotally connected levers connects an end of the locking pin extending through an aperture in the spring housing to a control cable which is part of a manually operable control mechanism. A cam lever is camable against the bearing surface of the first member so that actuation of the control mechanism by a manual lever rotating a cross shaft to turn a bell crank connected to the control cable results in retraction of the pin against the bias of the spring. A plurality of such latching mechanisms is controlled by a single throw of the control lever.

BRIEF DESCRIPTION OF THE DRAWINGS

FIG. 3 is a cross-sectional view taken along lines III—III in FIG. 1, and showing details of the first embodiment of the latching mechanism; and, FIG. 4 is a similar view taken along lines IV—IV in FIG. 1, showing details of yet another embodiment.

DETAILED DESCRIPTION

Figure 1:
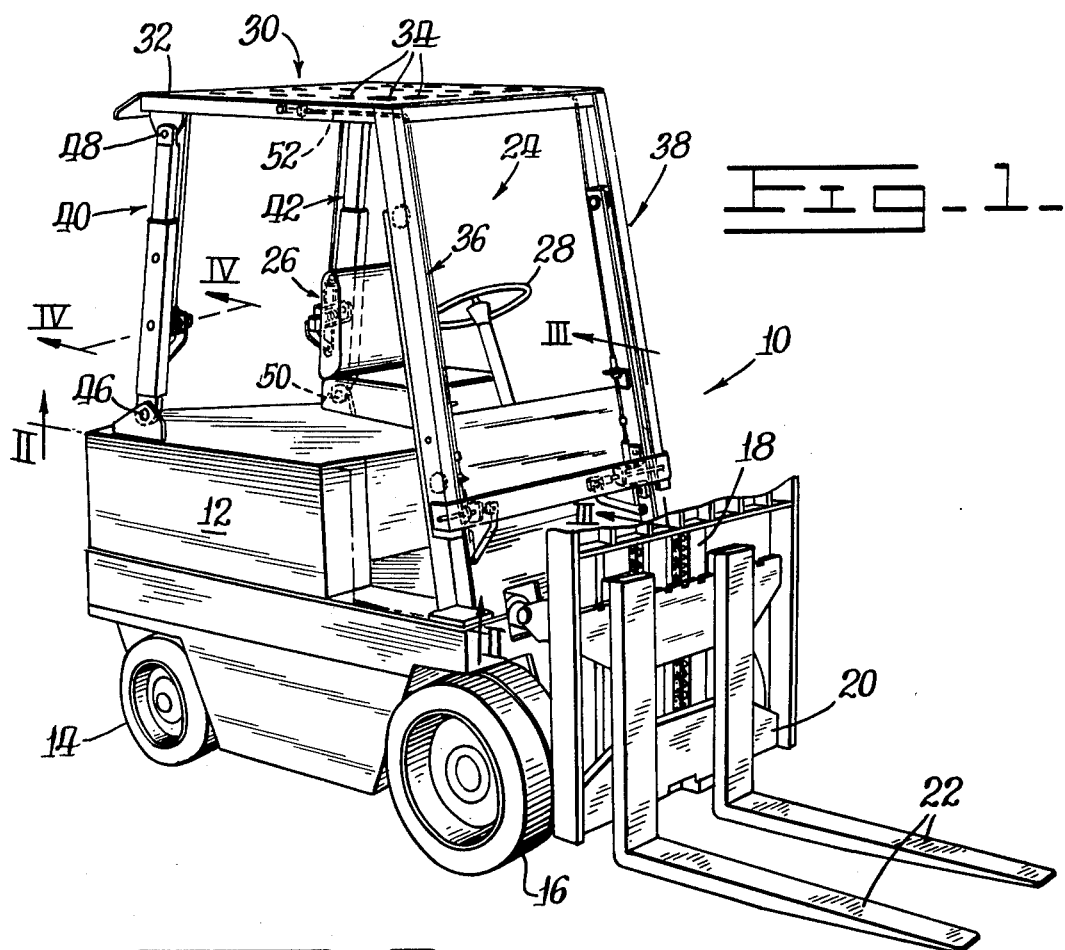
FIG. 1 is an overall isometric view of a lift truck combining the latching mechanism of the instant invention in conjunction with overhead guard.

Turning to FIG. 1, there is shown generally at 10 a fork lift truck having a body 12 supported by a plurality of wheels, two of which are shown at 14 and 16. The fork lift truck includes a front mounted mast 18 (partially cut away for clarity) which mounts a carriage 20 having a pair of forks 22 mounted thereon. The fork lift truck vehicle includes an operator station generally shown at 24. An operator seat 26 is mounted on the body 12. A steering wheel 28 controls the steering of the vehicle through steering and control means (not shown).

Mounted on the top of the vehicle is a collapsible overhead guard generally shown at 30. The collapsible overhead guard is more fully described in U.S. Application Ser. No. 643,413, filed Dec. 22, 1975 and assigned to the same assignee. Overhead guard 30 clears a generally horizontally disposed roof 32 having a plurality of apertures 34 therein. Front telescoping support members 36, 38 are fixedly connected to the front corners of roof 32 and body 12. Similarly, rear telescoping support members 40, 42 are pivotally connected to the rear corner of the roof 32 and body 12. The inner connection is made by means of pivots 46, 48, 50 and 52.

Figure 2:
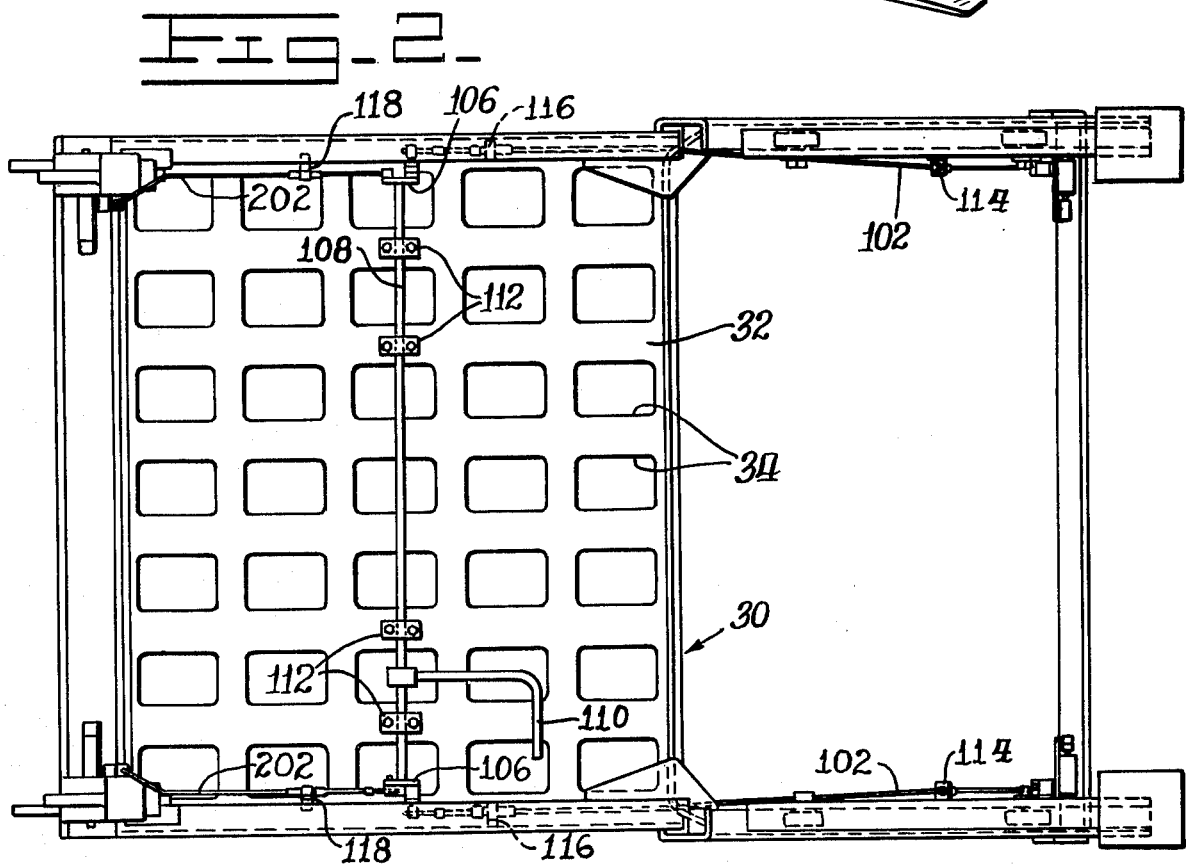
FIG. 2 is a view of the underside of the overhead guard taken along lines II—II in FIG. 1 and showing details of the control mechanism.

As best seen in FIGS. 2 and 3, each front support member comprises a generally L-shaped elongated member 54, and a generally C-shaped member 56. The plurality of bearing members, one of which is shown at 58, serves to facilitate relative movement between members 54, 56. Member 58 is mounted on member 54 by means of bolt fasteners 60.

In the first embodiment shown in FIG. 3, the first aperture 62 within first member 54 is actuable to be in alignment with the second aperture 64 in second member 56. Locking pin 66 having a larger diameter end 68 and a smaller diameter end 70 is spring biased by means of spring 72 into the locked position shown. Spring 72 is contained within a generally cup-shaped spring housing 74 which is removably mounted on first member 54 by means of bolts 76. Cup-shaped spring housing 74 has an aperture through the base end thereof slidably receiving smaller diameter end 70 of pin 66. Spring 72 is contained between this base end and a disc-shaped spring retainer 80 having an aperture therethrough and fitted over smaller diameter end 70. The guideblock 82, having an aperture 84 aligned with the first aperture 62, serves to help steady and guide pin 66.

Cam lever means generally shown at 86 are comprised of first and second cam levers 88, 90, which are pivotally connected by means of pivots 92, 94 to a block 96. Block 96 has a slot 98 wherein accommodating small end 70 of pin 66 projects from spring housing 74. Pin 100 through block 96 serves to pivotally attach the small end of the block. Actuation of control cable 102 by a control mechanism, as will be hereinafter described, causes second lever 90 to move in a direction generally parallel to first and second members 54, 56. First lever 88 is of a length which is greater than the distance from support surface 107 to pin 94. This, in turn, causes a nylon roller 104 on pivot 92 to bear against bearing surface 107, thereby causing pin 66 to be retracted against the biasing force spring 72 and thus freeing the second member 56 for relative movement with respect to first member 54.

Turning now to FIG. 4, the second embodiment is like the first embodiment in most respects. However, with this embodiment the spring housing is fixedly mounted on guide block 282, which is in turn mounted on second member 256. It should also be noted that first and second members 254 and 256 are hollow box-shaped members, whereby each provides a second pair of aligned apertures 262, 264 for an enhanced locking or latching effect. In addition, rather than pins 266 being stepped as with the first embodiment, the pin is of constant diameter. The spring retainer 280 includes a second retainer 281 fitted within a groove in pin 266.

As best seen in FIG. 2, the control mechanism includes bell crank 106 at opposite ends of a rotatable cross shaft 108. Shaft 108 is rotatable manually by means of an L-shaped lever 110 which is fixed thereto. The plurality of bushings 112 serve to mount the cross shaft for rotation on the supporting surface such as overhead guard roof member 32.

In operation, manual movement of control lever 110 causes shaft 108 to rotary and thereby rotate the bell cranks 106. Bell cranks 106 in turn move control cables 102, 202, which are guided by means of sheeves and guide brackets 114, 116 and 118.

It is to be understood that the foregoing description is merely illustrative of a preferred embodiment of the invention, and that the scope of the invention is not to be limited thereto, but is to be determined by the scope of the appended claims.

What is claimed is:

1. A latching mechanism in combination with a first member relatively movable with respect to a second member, and having a first aperture in said first member alignable with a second aperture in said second member, said latching mechanism comprising:
   a locking pin slidably fitted within said first aperture and engageable within said second aperture when said first and second members are positioned so that said apertures are in alignment;
   means biasing said locking pin in a direction to be engaged within said second aperture; and,
   lever cam means pivotally connected to the end of said lock pin opposite to the end engageable within said second aperture and cammable against a bearing surface of said first member whereby said pin may be retracted against the force of the baising means to disengage from said second aperture wherein said lever cam means comprises a first lever defining a pair of opposite ends and means pivotally connecting one end of said first lever to said end of said pin opposite to the end engageable within said second aperture, a second lever defining a pair of ends, means pivotally connecting one end of said second lever to the other end of said first lever, said levers being positioned and of a length so that movement of said second lever in a direction generally parallel to said first and second members causes said locking pin to be moved opposite to the direction wherein it is engaged within said second aperture.

2. The invention of claim 1 wherein said biasing means is a spring.

3. The invention of claim 2 wherein said biasing means further comprises a spring housing mounted on said first member and wherein said spring is compressible between said spring housing and said pin.

4. The invention of claim 3 wherein said pin is stepped so as to define a larger and a smaller diameter end, said smaller diameter end extending through an aperture in said spring housing, and said larger diameter end extending through said first aperture.

5. The invention of claim 4 further including a generally circular disc-shaped spring retainer having a centrally disposed aperture therein, said spring retainer being positioned over said smaller diameter end, and said spring being positioned over said smaller diameter end in contacting relation with said spring housing and said spring retainer.

6. The invention of claim 3 further including a guide block mounted on said first member and having an aperture therethrough in alignment with said first aperture.

7. The invention of claim 6 wherein said spring housing is removably mounted on said first member by fastener means.

8. The invention of claim 6 wherein said spring housing is mounted on said guide block.

9. The invention of claim 1 wherein said lever cam means further include a roller on said pivot between said first and second lever adapted to bear against said bearing surface.

* * * * *

UNITED STATES PATENT OFFICE
CERTIFICATE OF CORRECTION

Patent No. 4,035,096           Dated   July 12, 1977

Inventor(s)   Robert Henry Miller

It is certified that error appears in the above-identified patent and that said Letters Patent are hereby corrected as shown below:

Column 2, line 62, before "the", second occurrence, insert -- pin 66 to --; line 67, before "support" insert -- cam --.

Column 4, line 2, "baising" should read -- biasing --.

Signed and Sealed this

Second Day of May 1978

[SEAL]

Attest:

RUTH C. MASON
Attesting Officer

LUTRELLE F. PARKER
Acting Commissioner of Patents and Trademarks